Patented Oct. 4, 1949

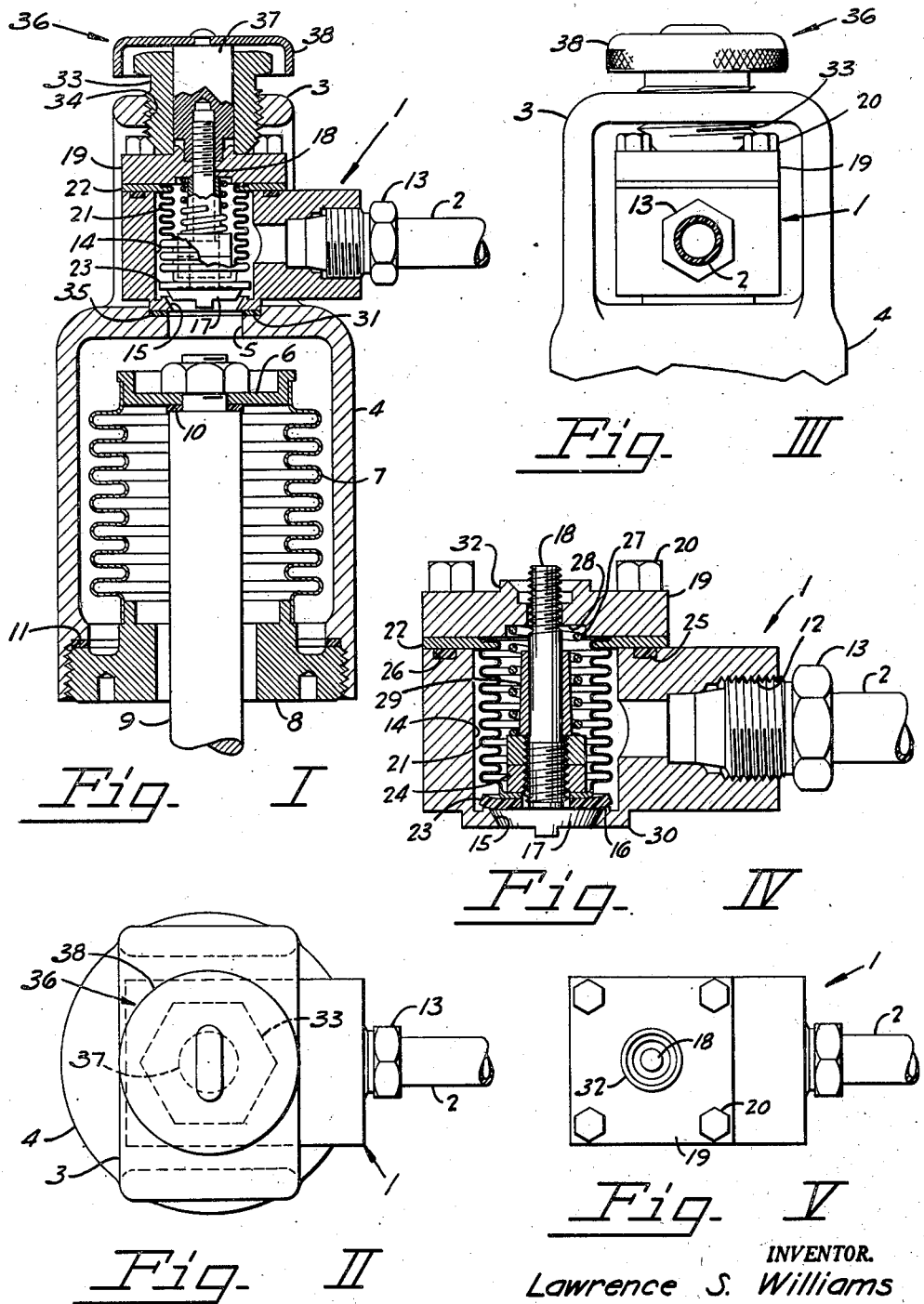

2,483,990

UNITED STATES PATENT OFFICE 2,483,990

VALVE CONNECTOR DEVICE

Lawrence S. Williams, Toledo, Ohio, assignor to Toledo Scale Company, Toledo, Ohio, a corporation of New Jersey Application July 23, 1946, Serial No. 685,596

6 Claims. (Cl. 284—17)

This invention relates to apparatus for transmitting hydraulic pressure from a source of pressure to a pressure receiver and more particularly to a connector that may be separated from the pressure receiver without releasing the pressure or fluid from the pressure transmitter.

Hydraulic pressure may be used to transmit force from one location to another as, for example, from a hydraulic capsule serving as a support for a weighing scale load receiver to a pressure receiver that acts against a load counterbalancing and indicating mechanism. When a hydraulic force transmitting system is used in a weighing scale it is necessary that the system be completely filled and free from air. With ordinary connecting devices it is practically impossible to replace a pressure receiver and secure correct operation unless the entire system is evacuated and refilled with fluid after the replacement pressure receiver has been connected. This refilling is necessary because the system must be maintained under a small initial pressure and this pressure and some of the fluid is lost as soon as a connection is opened.

The principal object of this invention is to provide a connector that includes a valve to retain the pressure and fluid in the hydraulic capsule and connecting line when the pressure receiver is disconnected.

Another object of the invention is to provide a valved connector designed so that the valve must be closed before the connector may be disassembled from the pressure receiver.

A still further object is to provide a connector for the pressure receiver end of a connecting tube of a hydraulic pressure transmitting system which connector includes a valve member, one side of which is substantially flush with an exterior surface of the connector.

A still further object is to provide a connector that includes a valve that is resiliently urged toward its closed position and whose operating mechanism is arranged to prevent disassembly of the connector from a pressure receiver unless the valve is closed.

These and other objects and advantages are apparent from the following description in which reference is made to the accompanying drawings.

In the drawings:

Figure I is a vertical section of a hydraulic pressure receiver and the improved connector.

Figure II is a plan view of the connector installed on the pressure receiver.

Figure III is an elevation of the upper end of the pressure receiver showing the connector installed in its operative position.

Figure IV is an enlarged vertical section of the valve connector.

Figure V is a plan view of the connector body.

These specific figures and the accompanying description are intended merely to illustrate the invention but not to impose limitations on the claims.

The invention consists of a connector body that is secured to the end of a tube and that is clamped over on opening in a pressure receiving chamber with a hole in the connector body in registry with the opening, the connector being provided with a valve that closes the hole and an operator for the valve which operator must be removed and the valve closed before the connector can be disassembled from the pressure receiver. Because the valve member of the connector must be closed before the connector may be disassembled, and because when the valve is closed its exterior surface is substantially flush with or protrudes from the exterior surface of the connector body, the connector may be removed and reinstalled on a pressure receiver without releasing any liquid from the pressure transmitting system or entrapping any air in the system.

In the example illustrated in the drawings a valve connector body 1 secured to the end of a tube 2 whose other end is connected to a hydraulic pressure transmitter is clamped beneath a bridge 3 of a pressure receiver housing 4. Hydraulic pressure that is transmitted through the tube 2 is transmitted through the connector 1 and through a hole 5 leading into the interior of a cup-shaped recess of the pressure receiver 4. The hydraulic pressure acts against a cap 6 secured to one end of a corrugated bellows 7 whose other end is sealed to an annular member 8 that is threaded into the mouth of the cup-shaped portion of the pressure receiver housing 4. The hydraulic pressure acting against the cap 6 and the bellows 7 tends to compress the bellows and thus transmit force through a strut 9 that is attached to the cap 6 and that extends out through the annular member 8. A gasket 10 compressed between a shoulder on the end of the strut 9 and the cap 6 prevents leakage of fluid through the cap 6. Another gasket 11 mounted in the mouth of the cup-shaped portion of the housing 4 prevents leakage of fluid along the threads of the annular member 8.

The connector body 1 (Figure IV) consists of a generally rectangular metallic block having a drilled and tapped hole 12 in an end thereof to receive a compression fitting 13 for connecting the end of the tube 2. The hole 12 communicates with a cylindrical chamber 14 one end of which has a tapered opening 15 surrounded by a raised valve seat 16. A valve disk 17 formed integrally on the end of a threaded stem 18 and positioned in the chamber is tapered to fit the opening 15 with one of its surfaces either flush with or protruding from the exterior surface of the connector body 1.

The connector body 1 is provided on its side opposite the valve disk 17, with a cover 19 secured in place by four cap screws 20, the cover being drilled at its center to allow the threaded stem 18 to protrude therethrough. In order to prevent leakage of hydraulic fluid from the chamber 14 along the threaded stem 18, a bellows 21 has one end sealed to the valve disk 17 and its other end sealed to a rectangular washer 22 that is interposed between the valve connector body 1 and its cover 19. The fluid containing portion of the connector body is the space within the chamber 14 and outside of the bellows 21. A washer 23 of stiff gasket material is clamped between the surface of the valve disk 17 and the end of the bellows 21 by a pair of nuts 24 threaded on the stem 18 to prevent leakage of fluid from the fluid chamber into the interior of the bellows. When the valve is closed the gasket washer 23 is pressed firmly against the valve seat 16 to prevent any leakage of fluid out of the connector body. The other end of the fluid chamber is sealed by a ring gasket 25 positioned beneath the rectangular washer 22 that is compressed into a groove 26 cut in the juxtaposed surface of the connector body 1 when the cap screws 20 holding the cover 19 are tightened.

A coil spring 27 surrounding the threaded valve stem 18 is seated in a counterbore 28 in the cover 19 and presses against the nuts 24 to urge the valve disk 17 into its closed position. The extent to which the valve may be opened by drawing the valve stem 18 through the cover 19 is limited by a spacing collar 29 mounted on the valve stem 18 within the coil spring 27.

The surface of the connector body 1 adjacent the valve disk 17 is machined to leave a cylindrical piloting surface 30 that fits within a counterbore 31 surrounding the opening 5 leading into the pressure receiver 4. The cover 19 is also machined to leave a cylindrical piloting portion 32 that is concentric with the threaded valve stem 18 and the piloting surface 30. The connector body 1 is attached to the pressure receiver by screwing an externally threaded sleeve 33 through a threaded hole 34 in the bridge 3 against the cover 19 so as to drive the piloting surface 30 tightly against a gasket 35 in the counterbore 31. The inner diameter of the sleeve 33 is a close fit over the cylindrical piloting surface 32 of the cover 19 so that the connector body is accurately guided as it is clamped into place.

A valve operator 36 in the form of an axially drilled and tapped stem 37 attached to a skirted disk handle 38 may be inserted into the sleeve 33 and screwed onto the end of the valve stem 18 until it lifts the valve stem against the resiliency of the spring 27 to open the valve. The skirt of the handle 37 covers the end of the threaded sleeve 33, which end is hexagonal to permit the use of a wrench in tightening the sleeve, so that the connector cannot be loosened or removed until the valve operator 36 is removed.

The removal of the valve operator 36 allows the spring 27 to close the valve so that the connector is ready for removal.

When the connector body 1 is to be attached to the pressure receiver housing 4 the receiver housing is placed in an upright position with the bridge 3 uppermost and the fluid containing portion of the receiver is filled until the liquid level is flush with the top of the opening 5 including the counterbore 31. The pressure transmitter and connecting line having been previously evacuated and filled with fluid, the connector is then clamped in place with the piloting surface 30 and the valve disk 17 displacing some of the fluid from the counterbore 31. Because the valve disk 17, when closed, is substantially flush with or protrudes through the surrounding portion of the connector body 1, there is no upwardly directed recess or cavity in which air may be entrapped. After the connector is securely clamped and the valve operator is used to open the valve the upward movement of the valve disk 17 withdraws a slight amount of fluid from the pressure receiver until the washer 23 is lifted from the valve seat 16. As soon as the valve is opened the fluid is free to distribute itself to equalize the pressure between the pressure transmitting system and the pressure receiver.

The improved connector simplifies the replacement of a pressure receiver because it permits the pressure receiver to be disconnected without losing fluid from those portions of the pressure transmitting system that are under pressure. After the valve is closed the pressure receiver may be unloaded so as to reduce the pressure within the receiver with the result that no fluid is lost or displaced from the receiver when the connector is removed. If the pressure receiver is disconnected while under pressure, a certain amount of fluid will be lost from the receiver by the upward expansion of the bellows 7. If this fluid is not made up by unloading the pressure receiver and adding fluid to it before the connector is replaced, the lost fluid must be supplied from the pressure transmitter.

The valve connector also makes it possible to introduce a small amount of fluid into the hydraulic pressure transmitting system by unloading the pressure receiver to compress the bellows 7, filling the chamber before the connector is put in place and the subsequently, after opening the valve, bringing the bellows 7 to its normal condition thereby forcing some of the fluid from the pressure receiver into the connecting line.

Various modifications and changes in design of the improved valve connector to adapt it for specific uses may be made without departing from the spirit and scope of the invention.

Having described the invention, I claim:

1. In a device of the class described, in combination, a connector body that may be attached to the end of a tube, means for securing the connector body to a fluid containing chamber with a hole in the bottom wall of the connector body in registry with an opening in the chamber, a solid valve member mounted in the connector body that in closed position substantially fills the hole in the wall of the body, and a removable valve operator that at least partially encloses the securing means to bar access to the securing means while the valve is open.

2. In a device of the class described, in combination, a connector body that may be attached to the end of a tube, means for securing the connector body to a fluid containing chamber with a hole in the wall of the connector body in registry with an opening in the chamber, a bellows mounted within the connector body, a valve disk secured to an end of the bellows and positionable in the hole, a resilient member for urging the valve disk into the hole to a position at which the outer surface of the disk is substantially flush with the outer surface of the wall, and a removable valve operator for compressing the resilient member, said operator having a portion that at least partially encloses the securing means to prevent disassembly of the connector body from the chamber while the operator is in place.

3. In a device of the class described, in combination, a connector body that may be attached to a tube, a chamber having an opening in a wall thereof, a bridge over the opening in the chamber wall, the bridge serving as a frame to hold the connector body in registry with the opening, a screw threaded through the bridge for clamping the connector body to the chamber wall, a valve in the connector body, and operating means for opening the valve, said operating means also covering the screw to prevent removal thereof while the valve is open.

4. In a device of the class described, in combination, a connector body attached to a tube, a hydraulic pressure receiver having an opening for the introduction of hydraulic fluid, means for attaching the connector body to the pressure receiver, the connector body having a portion that enters the mouth of the opening, a valve member in the connector body, the valve member being positionable in the portion of the connector body with its exterior surface substantially flush with the exterior surface of the portion of the connector body and a valve operator having a portion that at least partially encloses the attaching means to prevent removal of the connector body from the pressure receiver when the valve is open.

5. In a device of the class described, in combination, a connector body that may be attached to the end of a tube, means for securing the connector body to a fluid containing chamber with a hole in the connector body is registry with an opening in the chamber, a valve member mounted in the connector body, and a removable member for opening the valve, said removable member having a portion arranged to prevent access to the securing means, whereby the removable member must be removed before the connector body may be removed from the chamber.

6. In a device of the class described, in combination, a connector body that may be attached to the end of a tube, means for securing the connector body to a fluid containing chamber with a hole in the connector body in registry with an opening in the chamber, a valve member mounted in the connector body, a removable member for opening the valve, and a handle attached to the removable member, which handle overlies the connector body securing means to require removal of the removable member before access to the securing means may be had.

LAWRENCE S. WILLIAMS.

REFERENCES CITED

The following references are of record in the file of this patent:

UNITED STATES PATENTS

| Number | Name | Date |
|---|---|---|
| 833,143 | Wolf | Oct. 9, 1906 |
| 1,266,192 | Anthony | May 14, 1918 |
| 1,593,772 | Litster | July 27, 1926 |
| 1,767,391 | Muller | June 24, 1930 |
| 1,952,110 | Baker | Mar. 27, 1934 |
| 2,038,477 | Collins | Apr. 21, 1936 |
| 2,203,922 | Paisley | June 11, 1940 |
| 2,286,623 | Kellaher et al. | June 16, 1942 |
| 2,372,820 | Gardes | Apr. 3, 1945 |
| 2,444,137 | Main | June 29, 1948 |
| 2,444,451 | Kelso | July 6, 1948 |

FOREIGN PATENTS

| Number | Country | Date |
|---|---|---|
| 752,652 | France | Sept. 28, 1933 |
| 353,195 | Italy | Oct. 7, 1937 |